United States Patent
Rosenthal et al.

(10) Patent No.: US 6,633,294 B1
(45) Date of Patent: Oct. 14, 2003

(54) METHOD AND APPARATUS FOR USING CAPTURED HIGH DENSITY MOTION FOR ANIMATION

(76) Inventors: Seth Rosenthal, 453 Cabrillo St., San Francisco, CA (US) 94118; John R. Anderson, 32 Dutch Valley La., San Anselmo, CA (US) 94960; Steve Sullivan, 1808 Pacific Ave. #401, San Francisco, CA (US) 94109

( * ) Notice: Subject to any disclaimer, the term of this patent is extended or adjusted under 35 U.S.C. 154(b) by 182 days.

(21) Appl. No.: 09/802,829

(22) Filed: Mar. 9, 2001

Related U.S. Application Data

(60) Provisional application No. 60/188,062, filed on Mar. 9, 2000.

(51) Int. Cl.$^7$ ............................................. G06T 15/70
(52) U.S. Cl. ...................................... 345/474; 345/441
(58) Field of Search ................................ 345/441, 473, 345/474, 649

(56) References Cited

U.S. PATENT DOCUMENTS

| | | | | |
|---|---|---|---|---|
| 6,043,827 A | * | 3/2000 | Christian et al. | 345/474 |
| 6,052,132 A | * | 4/2000 | Christian et al. | 345/474 |
| 6,097,381 A | * | 8/2000 | Scott et al. | 707/500.1 |
| 6,285,794 B1 | * | 9/2001 | Georgiev et al. | 382/243 |
| 6,449,019 B1 | * | 9/2002 | Fincher et al. | 348/578 |

OTHER PUBLICATIONS

J. R. Anderson and John R. Gyakum, "A Diagnostic Study of Pacific Basin Circulation Regimes as Determined from Extratropical Cyclone Tracks", 1989 American Meteorological Society, Monthly Weather Review, vol. 117, Dec. 1989.

V. Blanz, T. Vetter, Max–Planck–Institut für Biologische Kybernetik, "A Morphable Model for the Synthesis of 3D Faces", SIGGRAPH 99 Computer Graphics Proceedings Annual Conference, p. 187–194, Los Angeles , CA, Aug. 8–13, 1999.

B. Guenter, C. Grimm, D. Wood, H. Malvar, F. Pighin, Microsoft Corp., University of Washington, "Making Faces", SIGGRAPH 98 Computer Graphics Proceedings Annual Conference, p. 55–65, Orlando, Florida, Jul. 19–24, 1998.

F. Pighin, J. Hecker, D. Lischinski, R. Szeliski, D. Salesin, University of Washington, The Hebrew University, Microsoft Research, "Synthesizing Realistic Facial Expressions from Photographs", SIGGRAPH 98 Computer Graphics Proceedings Annual Conference, p. 75–84, Orlando, Florida, Jul. 19–24, 1998.

* cited by examiner

Primary Examiner—Mano Padmanabhan
Assistant Examiner—Huedung X. Cao
(74) Attorney, Agent, or Firm—Irell & Manella LLP

(57) ABSTRACT

A technique for high-resolution motion capture according to the present invention includes a high-resolution makeup scheme and calibration object to optimize data capture. Data reduction and processing techniques reduce noise in the raw data and result in sufficient captured data to permit the use of several different image-processing techniques alone or in combination. The processed image data may be used to drive an animated character. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

13 Claims, 4 Drawing Sheets

METHOD AND APPARATUS FOR USING CAPTURED HIGH DENSITY MOTION FOR ANIMATION

This Application claims the benefit of Provisional Application Ser. No. 60/188,062 field Mar. 9, 2000.

BACKGROUND OF THE INVENTION

1. Field of the Invention

This invention relates to motion capture techniques and more specifically to a method and apparatus for facial motion capture for use animating actors having different facial geometry's.

2. Description of the Prior Art

Motion capture for the entertainment industry is a generally expensive and complicated process that is often limited to capturing gross motion of a character's position and limbs. Motion of a live actor may be captured and may be used to drive an animated character.

What is needed are methods and apparatus for capturing the detail, range and subtle motions of a high density actor such as a human face and methods and apparatus for transferring captured high density motion to one or more computer generated characters.

SUMMARY OF THE INVENTION

In a first aspect, the present invention provides a technique and surface treatment for a high-density surface to be captured. The use of the technique and surface treatment maximize captured information and thus permit the use of multiple image processing techniques alone or in combination to extract motion and position information.

In another aspect, the present invention provides a high-resolution calibration object to optimize the accuracy of the image capture array.

In another aspect, the present invention provides an image-based technique for extracting and reducing image capture data forming a shape library for a given high-density surface or actor. This processing technique may be used to reduce the noise in the raw data. The shape library may be used to create a new performance for a surface or actor based on the captured database of the actor's range of expressions. The new performance may be used to drive an animated surface or character.

In still another aspect, the present invention provides a technique for facial motion capture that may be incorporated into a conventional entertainment production process.

These and other features and advantages of this invention will become further apparent from the detailed description and accompanying figures that follow. In the figures and description, numerals indicate the various features of the invention, like numerals referring to like features throughout both the drawings and the description.

DETAILED DESCRIPTION

Figure 1:
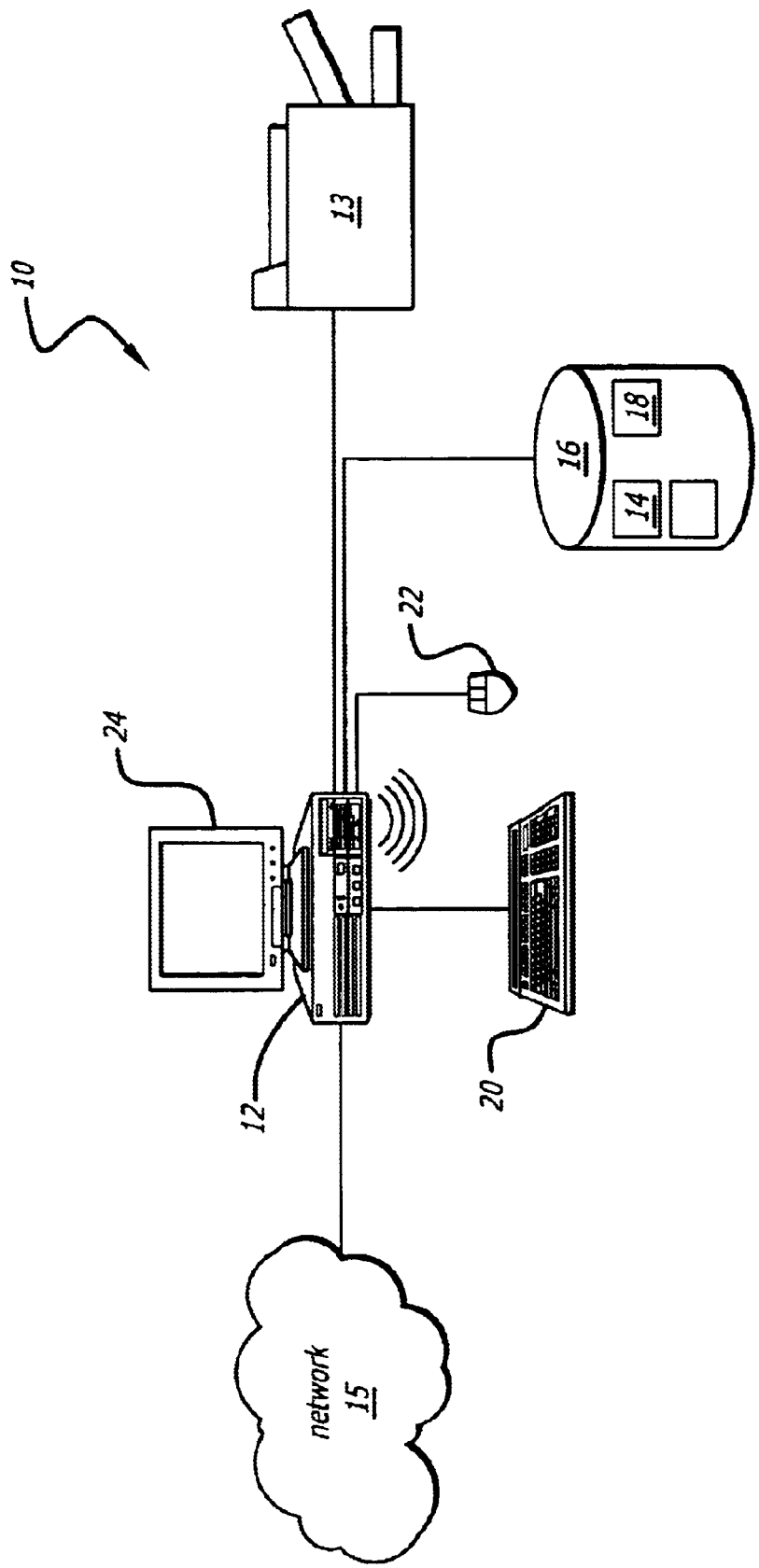
FIG. 1 is a block diagram of a computer apparatus according to the present invention.

Referring now to FIG. 1, the general architecture of a digital computer system 10 for implementing the present invention is shown. Processor 12 may be any standard digital computer processor. In a currently preferred embodiment of the present invention processor 12 is a workstation-class processor such as SILICON-GRAPHICS INDIGO2-EXTREME for interactive work, or SILICON-GRAPHICS CHALLENGE SERVERS FOR BATCH PROCESSING, running any appropriate conventional operating system such as the IRIX5.3 operating system. Although the processor 12 is shown as one unit, it will be appreciated that separate processes may be employed for interactive use and batch processing. System software 14 may be stored on storage unit 16 which may be any conventional storage device such as an internal fixed disk drive. Also preferably stored on storage unit 16 is software 18 that, in accordance with the present invention, performs image capture and manages the necessary data, as described in greater detail below. An interactive user input, where referenced below, may be provided via standard input peripherals such as keyboard 20 and/or mouse 22. Graphical output created by processor 12 under control of software 18 may be transmitted to a display device such as video monitor 24 for display to users; equivalently, output may also be transmitted to a printing devices to generate hard copy output in the form of videotape, film, slides, or the like.

Figure 2:
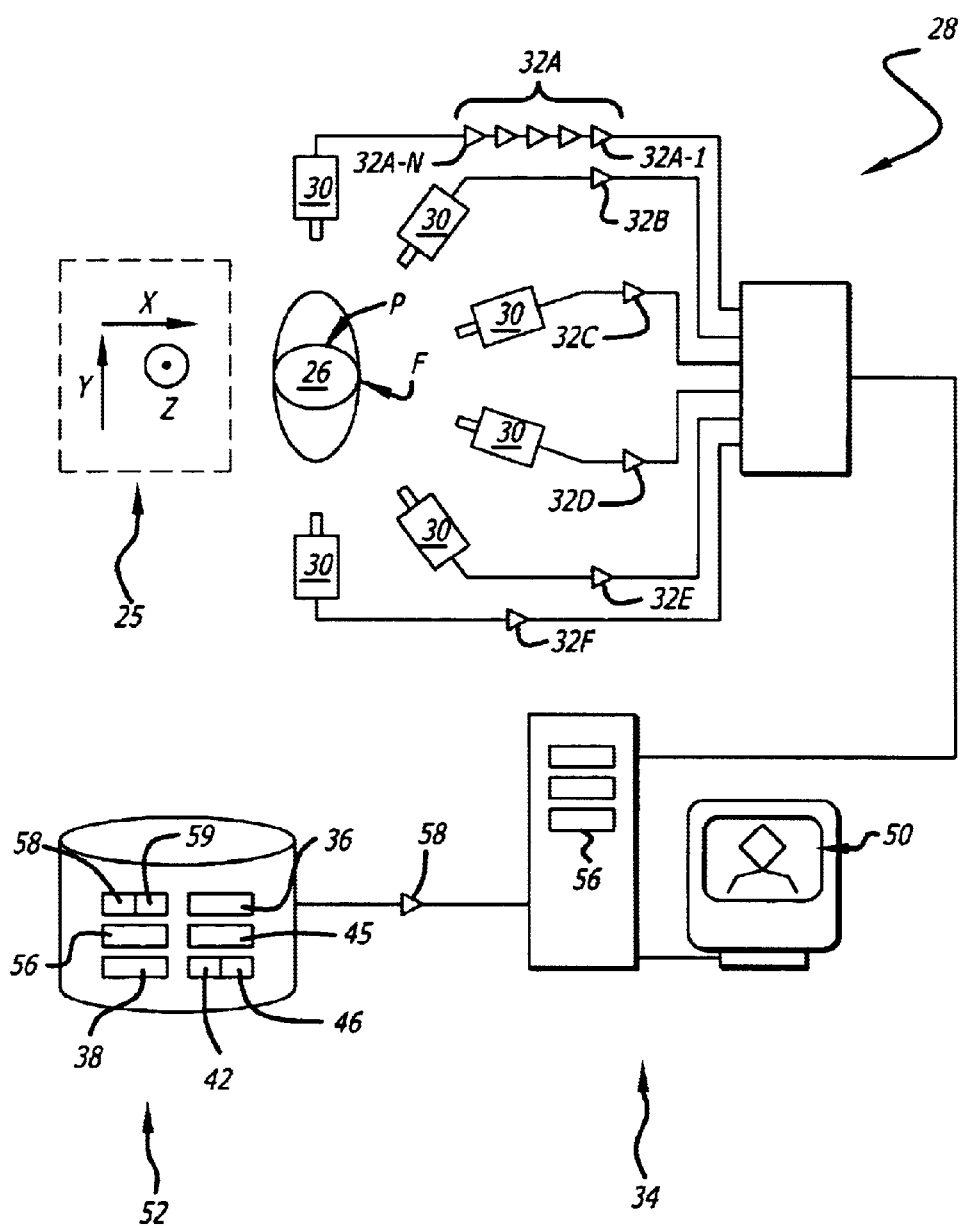
FIG. 2 is a facial motion capture system according to the present invention.

Referring now to FIG. 2, high-density motion such as facial motion of actor 26 may be captured using apparatus 28. Two or more synchronized and calibrated image capture devices such as cameras 30 may be used to capture motion of actor 26. The number and resolution of cameras 30 is selected to provide sufficient coverage of the areas of actor 26 that will be moving. Cameras 6 may be arranged to provide maximum coverage in three dimensions. In a currently preferred embodiment of the present invention 6 cameras were used to capture motion of about 1500 track points P on one or more surfaces of actor 26 such as face F. Image sequences 32A–32F may be collected and cataloged by device 34 to form one or more data files 36.

In the currently preferred embodiment of the present invention a sequence such as image sequence 32A represents a plurality of images or frames 32A-1 to 32A-n which capture the motion of actor 26 during a period of time T from t=1 to t=n. Each camera 30 is calibrated and synchronized to capture a parallel sequence of images 32A, 32B, 32C, 32D, 32E and 32F. Each frame of a sequence represents a synchronized slice of time and may be seen from each camera for example as images or frames 32A-5, 32B-5, 32C-5, 32D-5, 32E-5 and 32F-5.

Figure 4:
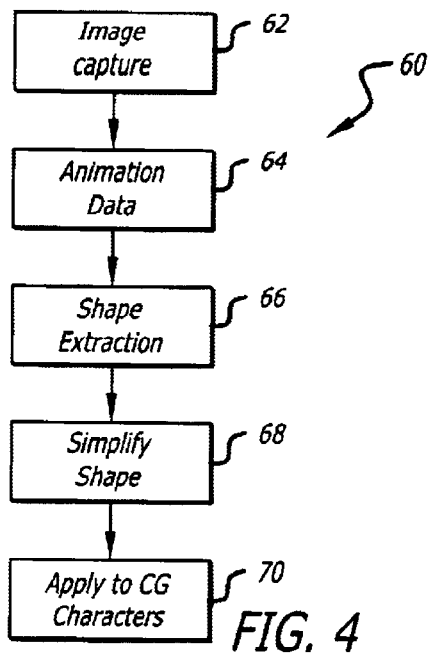
FIG. 4 is a flow diagram of facial motion capture and use according to the present invention.

Referring now to FIG. 4, general process flow 60 according to the present invention is shown. At step 62 actor 26 is captured in one or more series or sequences of images 32A. Each image from image 32A-1 to image 32A-n of sequence 32A may be used to generate animation data 38 using software tools such as tracker 46 at step 64. Animation data 38 may be subjected to mathematical analysis at step 66 such as singular decomposition analysis to yield shape data 56 and shape weight curves 59. At step 68, shape data 56 and shape; weight curves 59 may be simplified using processes such as basis function rotation to yield equivalent simplified shapes 58 and shape weight curves 59.

At step 70, shapes 58 and shape weight curves 59 may be applied to one or more CG characters to impart motion characteristics from actor 26.

Data Extraction/Tracking

Figure 5:
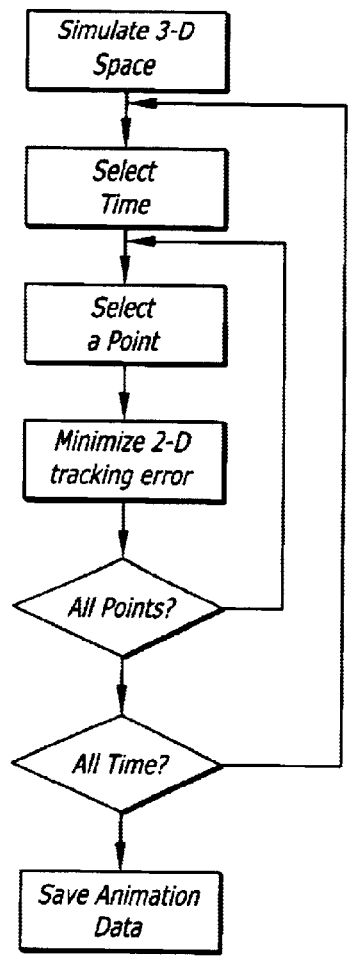
FIG. 5 is a flow diagram for animation data processing according to the present invention.

Referring now to FIG. 5, animation data 38 may be extracted from image sequence 32A using a plurality of reference points P marked or secured on actor 26. Points may be individual items or marks or they may be intersections of lines or they may be naturally occurring references on an actor such as moles or scars. High-resolution images such as image 32A-1 may use from 1000 to 1500 points and high contrast makeup for and in a currently preferred embodiment of the present invention 1500 points are used for high-resolution studio sessions. Low resolution set work may use from 100 to 500 points P with little or no special makeup required.

Figure 3:
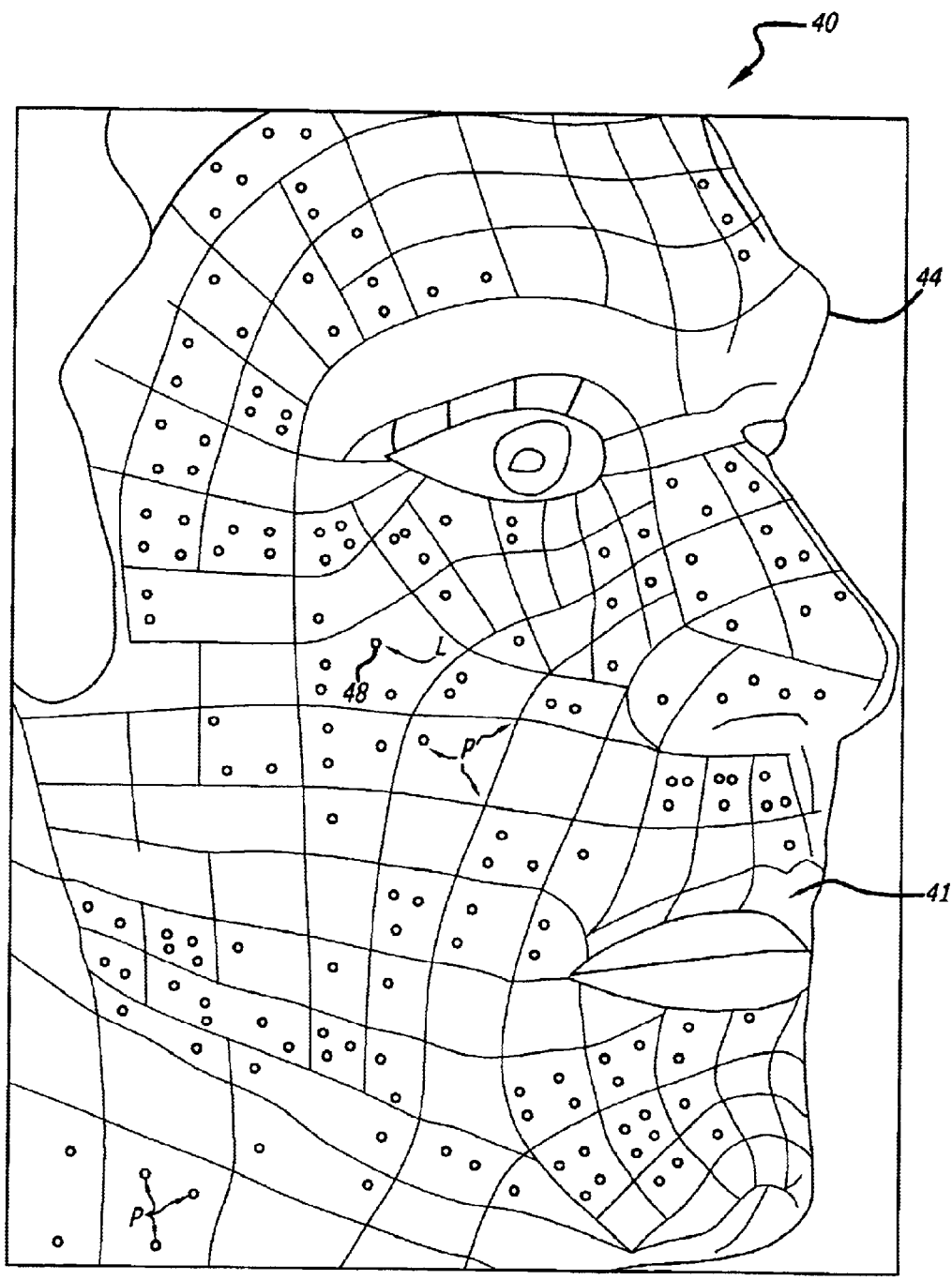
FIG. 3 is a three-dimensional shape according to the present invention.

Software tools 42 may be used to form a shape 40 in a 3-dimensional space 44 as shown in FIG. 3. Tracker 46 may compute a location L in 3-dimensional space 44 for point 48. Location L may then be projected back onto image 32A-x from each image sequence 32A-F for time T=x. Tracker 46 then seeks to minimize the two-dimensional tracking error for the combination of images 32A-x to 32F-x for location L. This procedure is repeated for each point for each frame or image of a sequence. Tracking a sequence results in animation data 38 which is a set of three-dimensional point data over time.

The tracking method according to the present invention also reduces data noise by rejecting noise using the correlated motion of multiple images for each instant of time.

Figure 6:
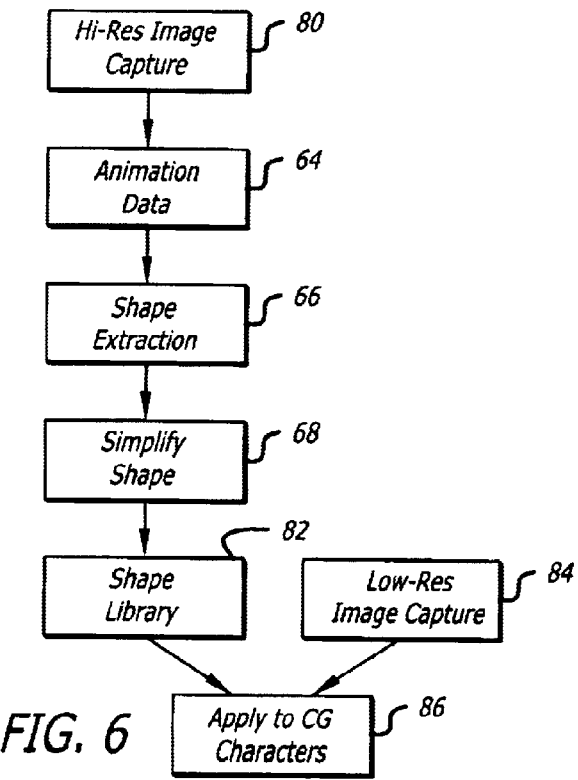
FIG. 6 is a flow diagram of shape library use according to the present invention.

Referring now to FIG. 6, to facilitate capture of facial motion of actor 26 on a set, one or more studio sessions may be conducted at step 80, with actor 26 using a high-resolution apparatus according to the present invention. Image sequences may be reduced to shape data as discussed above using steps 64, 66 and 68. Library 52 of facial data such as animation data 38 may then be constructed at step 82. As a result, low-resolution images 33 from step 84 may be used-with one or more data libraries 52 to map a high-resolution performance onto a computer generated actor 50 at step 86. Similarly, high-resolution data libraries may be used to enhance the expressive range of other actors by blending live action images 55 of a first actor and shape data 56 and shape weight curves 59 from library 52 of a second actor.

Shape Extraction and Simplification

Use a statistical analysis to extract a limited number of shapes that can be recombined to reconstruct the original performance. The result of the shape extraction is the set of shapes and a set of weight curves that specify how the shapes are combined over time to create the performance. In a currently preferred embodiment of the present invention the statistical analysis is a singular decomposition analysis.

The extraction of the shapes such as shape 40 is begun by taking the position time series of all position markers P in the stabilized head coordinate system such as coordinate system 25 and removing the mean value for a particular take or image. Three-dimensional motions are then weighted with spatially varying weights W for the purposes of equalizing the importance of facial regions with varying dot or marker densities and emphasizing the effect of variability in regions such as the lips 41 where small spatial motions are important for a high fidelity recreation of the performance.

The actual extraction step 66 is accomplished with a singular decomposition analysis which provides a weighted least squares optimal separation of variables (time vs. space) description of the weighted values for a given truncation order which is chosen to provide a high degree of performance fidelity while removing noise due to tracking error and other sources. The actual space values are then found by a reprojection of the derived time series on the original unweighted data set 45.

The method according to the present invention also provides a type of data compression. For a sequence consisting of 1080 frames and an actor having 1200 points in three dimensions the result is 3,888,000 data points. The singular decomposition analysis may reduce the data load to a number of face shapes and related weight curves, in the example, 17 face shapes and 17 weight curves with one value for each of the 1080 frames, or 38,760 data points.

Shape-driven Tracking

The shape library 52 has an additional and important application as part of the tracking method. Once we have a shape library or partial shape library, this data can be used to guide the tracking tools when tracking new image sequences 33A-1 to 33A-n. In the high resolution, or first phase as shown in step 80, tracking a subset of the image sequences as discussed above to generate an initial shape library 51. Then we can use initial shape library 51 to speed up additional tracking of the remaining high resolution image sequences, adding to library each time a new sequence is completed.

Referring now to FIG. 6, for low-resolution sequences with fewer cameras such as image sequences acquired on a set as at step 84, shape library 51 may be a key part of the tracking system 46. Rather than track the makeup features as independent entities, a method according to the present invention may be used to fit the shape library to the images by minimizing the error between the visible features and their corresponding vertices in shape space as in step 86. This is important for two reasons:

1) In this phase we are not using the tracked low-res makeup features directly. We are solving for the best fitting weights for the shapes in the high resolution shape library that match those low-resolution features. Those weight curves are the product of this process.

2) Using the library to constrain the tracking of the low-resolution make-up features makes the tracking more robust and automatable. This is the key feature that permits the extension of our approach to low camera counts (potentially as low a single camera).

Having now described the invention in accordance with the requirements of the patent statutes, those skilled in the art will understand how to make changes and modifications in the present invention to meet their specific requirements or conditions. Such changes and modifications may be made without departing from the scope and spirit of the invention as set forth in the following claims.

We claim:

1. A method of animating a computer generated actor comprising the steps of:

capturing two or more synchronized sequences of images of a live actor having a plurality of tracking points;

extracting animation data from the combination of images of the two or more synchronized sequences of images;

combining animation data to form a plurality of shapes having related weight curves;

mathematically transforming the shapes and weight curves to form equivalent shapes and weight curves according to user input;

animating a computer generated actor using the transformed shapes and weight curves.

2. The method of claim 1 wherein the step of extracting animation data further comprises the steps of:

recovering viewing parameters for each image of the synchronized sequence of images;

select a first tracking point;

compute a location in the three dimensional space for the first tracking point;

adjust the location using the first tracking point as seen in each of the two or more sequences; and repeating the above for each tracking point and each frame of a sequence.

3. The method of claim 1 wherein the step of combining animation data further comprises the steps of:

performing singular decomposition analysis on the animation data to form a plurality of shapes and weight curves.

4. The method of claim 1 wherein the image sequences are a function time.

5. The method of claim 1 further 2 comprising the steps of:

forming one or more shape libraries using the mathematically transformed shapes and weight curves.

6. The method of claim 2 wherein the step of recovering viewing parameters further comprise the step of:

computing position data, orientation data, and internal parameters for each image capture device and each image of each synchronized sequence of images.

7. A method of animating a computer generated actor comprising the steps of:

capturing two or more sequences of synchronized high resolution images of a live actor;

extracting animation data from each image of the two or more sequences of synchronized images;

extracting shape data;

simplifying the shape data; and forming a shape library including shape data;

capturing one or more sequences of low resolution images of a live actor;

extracting low resolution animation data from each image of the one or more sequences of images;

applying the shape data and low resolution animation data to animate a computer generated actor.

8. A sequence of computer generated images formed using a method comprising the steps of:

capturing two or more synchronized sequences of images of a live actor having a plurality of tracking points;

extracting animation data from the combination of images of the two or more synchronized sequences of images;

combining animation data to form a plurality of shapes having related weight curves;

mathematically transforming the shapes and weight curves to form equivalent shapes and weight curves according to user input;

animating a computer generated actor using the rotated transformed shapes and weight curves.

9. A apparatus for animating a computer generated actor comprising:

means for capturing two or more synchronized sequences of images of a live actor having a plurality of tracking points;

means for extracting animation data from the combination of images of the two or more synchronized sequences of images;

means for combining animation data to form a plurality of shapes having related weight curves;

means for mathematically transforming the shapes and weight curves to form equivalent shapes and weight curves according to user input;

means for animating a computer generated actor using the transformed shapes and weight curves.

10. The apparatus of claim 9 wherein the means for extracting animation data further comprises:

means for recovering viewing parameters for each image of the synchronized sequence of images;

means for select a first tracking point;

means for compute a location in the three dimensional space for the first tracking point;

means for adjusting the location using the first tracking point as seen in each of the two or more sequences; and means for repeating the above for each tracking point and each frame of a sequence.

11. The apparatus of claim 9 wherein the means for combining animation data further comprises:

means for performing singular decomposition analysis on the animation data to form a plurality of shapes and weight curves.

12. The apparatus of claim 9 further comprising:

means for forming one or more shape libraries using the mathematically transformed shapes and weight curves.

13. The apparatus of claim 10 wherein the means for recovering viewing parameters further comprises:

means for computing position data, orientation data, and internal parameters for each image capture device and each image of each synchronized sequence of images.

* * * * *